Patented Feb. 11, 1936

2,030,342

UNITED STATES PATENT OFFICE 2,030,342

ALLOY

William A. Wissler, Flushing, N. Y., assignor, by mesne assignments, to Union Carbide and Carbon Corporation, a corporation of New York No Drawing. Application July 15, 1933, Serial No. 680,661

7 Claims. (Cl. 75—1)

Alloys comprising cobalt, chromium, tungsten, and carbon, in which the cobalt may be replaced wholly or in part by iron and/or nickel, and the tungsten may be replaced in whole or in part by molybdenum, have been proposed and used for cutting tools and other articles which are subjected during use to abrasion and wear. Small amounts of manganese, silicon, and boron have been added to these alloys to modify their properties.

I have discovered that the addition of vanadium to the above described alloys improves markedly certain desirable properties. For example, the addition of 0.25% to about 20% vanadium increases the life of a cutting tool made from the alloys.

The invention comprises alloys within the range of compositions given in Table A.

Table A

| Constituent | Percent |
|---|---|
| Vanadium | 0.5 to 15 |
| Carbon | 1 to 4 |
| Chromium | 10 to 35 |
| Tungsten and/or molybdenum | 10 to 30 |
| Boron | 0.1 to 2.5 |
| Iron or nickel | 0 to 5 |
| Manganese | Less than 1.5 |
| Silicon | Less than 1.5 |
| Cobalt | Remainder |

A preferred range of compositions appears in Table B.

Table B

| Constituent | Percent |
|---|---|
| Vanadium | 1.5 to 6 |
| Carbon | 2 to 3 |
| Chromium | 25 to 35 |
| Tungsten | 10 to 25 |
| Iron | Not more than 5 |
| Nickel | Not more than 5 |
| Boron | 0.10 to 0.60 |
| Manganese | 0.10 to 1 |
| Silicon | 0.10 to 1 |
| Cobalt | Substantially the remainder. |

Tests have demonstrated the improved properties of the new alloys when used as cutting tools. For example, a number of tools containing substantially 14% tungsten, 30% chromium, 2.5% carbon, 3% iron, 0.15% boron, various percentages of vanadium, and balance cobalt and small amounts of manganese and silicon were used to cut a semi-steel billet about 8.5 inches in diameter, using a cut of 0.125 inches and a feed of 0.040 inches. The results of several of these tests are given in Table C, the length of cut in each test being expressed in inches measured along the axis of the billet.

Table C

| Tool No. | Percent V | Speed of cut Feet per minute | Length of cut Inches |
|---|---|---|---|
| 1 | 0 | 230 | 6 |
| 2 | 0.25 | 230 | 6 |
| 3 | 0.50 | 230 | 11 |
| 4 | 0.75 | 230 | 11 |
| 5 | 1.0 | 230 | 10 |
| 6 | 2.0 | 245 | 6.5 |
| 7 | 2.75 | 240 | 35 |
| 8 | 4.39 | 245 | 35 |
| 9 | 15 | 230 | 10 |

The alloy of the invention is suitable not only for cutting tools, but also, in the form of a welding rod or the like, for making hard, wear resistant deposits on metal articles.

I claim:

1. Alloy comprising substantially 1% to 4% carbon, 10% to 35% chromium, 1.5% to 6% vanadium, 10% to 30% tungsten, 0.10% to 2.5% boron, the remainder cobalt.

2. Alloy comprising substantially 2% to 3% carbon, 25% to 35% chromium, 1.5% to 6% vanadium, 10% to 25% tungsten, 0.10% to 0.60% boron, iron not more than about 5%, the remainder cobalt.

3. A cutting tool comprising substantially 2% to 3% carbon, 25% to 35% chromium, 1.5% to 6% vanadium, 10% to 25% tungsten, 0.10% to 0.60% boron, iron not more than about 5%, the remainder cobalt.

4. A welding rod comprising substantially 2% to 3% carbon, 25% to 35% chromium, 1.5% to 6% vanadium, 10% to 25% tungsten, 0.10% to 0.60% boron, iron not more than about 5%, the remainder cobalt 5. Alloy comprising substantially 1% to 4% carbon, 10% to 35% chromium, 0.5% to 15% vanadium, 10% to 30% of at least one metal of the group consisting of tungsten and molybdenum, 0.1% to 2.5% boron, 0.1% to 1% manganese, 0.1% to 1% silicon, remainder metal of the group iron, nickel, cobalt, the nickel being not over 5%, and the iron being not over 5%.

6. A cutting tool comprising substantially 1% to 4% carbon, 10% to 35% chromium, 0.5% to 15% vanadium, 10% to 30% of at least one metal of the group consisting of tungsten and molybdenum, 0.1% to 2.5% boron, 0.1% to 1% manganese, 0.1% to 1% silicon, remainder metal of the group iron, nickel, cobalt, the nickel and iron being not over 5% each.

7. A welding rod comprising substantially 1% to 4% carbon, 10% to 35% chromium, 0.5% to 15% vanadium, 10% to 30% of at least one metal of the group consisting of tungsten and molybdenum, 0.1% to 2.5% boron, 0.1% to 1% manganese, 0.1% to 1% silicon, remainder metal of the group iron, nickel, cobalt, the nickel and iron being not over 5% each.

WILLIAM A. WISSLER.